United States Patent [19]

Nyström

[11] 4,306,597
[45] Dec. 22, 1981

[54] TREE-FELLING APPARATUS

[75] Inventor: Sten Nyström, Mala, Sweden

[73] Assignee: Hultdins Verkstads AB, Mala, Sweden

[21] Appl. No.: 131,107

[22] Filed: Mar. 18, 1980

[30] Foreign Application Priority Data

Mar. 23, 1979 [SE] Sweden ............................... 7902645

[51] Int. Cl.$^3$ .............................................. A01G 23/08
[52] U.S. Cl. .................................................. 144/34 R
[58] Field of Search ................... 144/3 D, 34 R, 34 A, 144/34 E

[56] References Cited

U.S. PATENT DOCUMENTS 3,493,020  2/1970  Choat ................................. 144/34 E
3,565,141  12/1971  Galis .................................. 144/34 E
3,958,615  5/1976  Gaitten .............................. 144/34 E

FOREIGN PATENT DOCUMENTS 587909  1/1978  U.S.S.R. ............................. 144/34 E

Primary Examiner—W. D. Bray

[57] ABSTRACT

A tree-felling apparatus for felling trees and adapted to be suspended in the arm of a crane of a vehicle by means of a bearing shaft, said apparatus comprising a gripping means having gripper claws and a stand on which the gripper claws are pivotably journalled, a support means mounted to said stand to cooperate with the tree-trunk and a severing means mounted to said stand, and said apparatus being freely pivotable about said shaft which is journalled in said stand, said severing means being arranged below the gripping means seen in the operative position of the apparatus against the tree-trunk, said support means including a guide means located above, seen in said operative position, and spaced from said gripping means, said guide means being arranged to be applied against the tree-trunk to guide and position the gripping means and the severing means to operative positions with respect to the tree-trunk, and said apparatus being designed to assume an inclined position with respect to the ground when in unaffected condition with the guide means located in front of the gripping means and at a higher level than the end of the severing means facing away from the gripping means.

9 Claims, 6 Drawing Figures

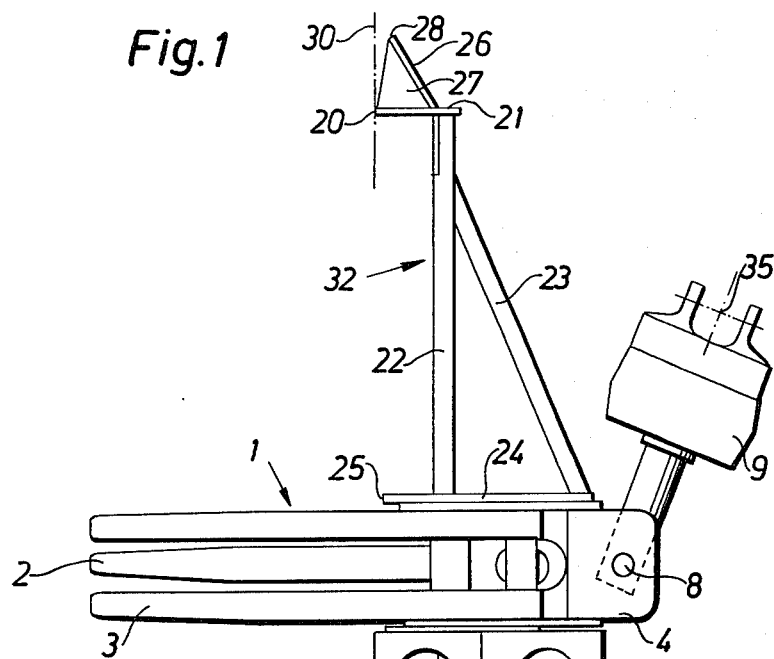
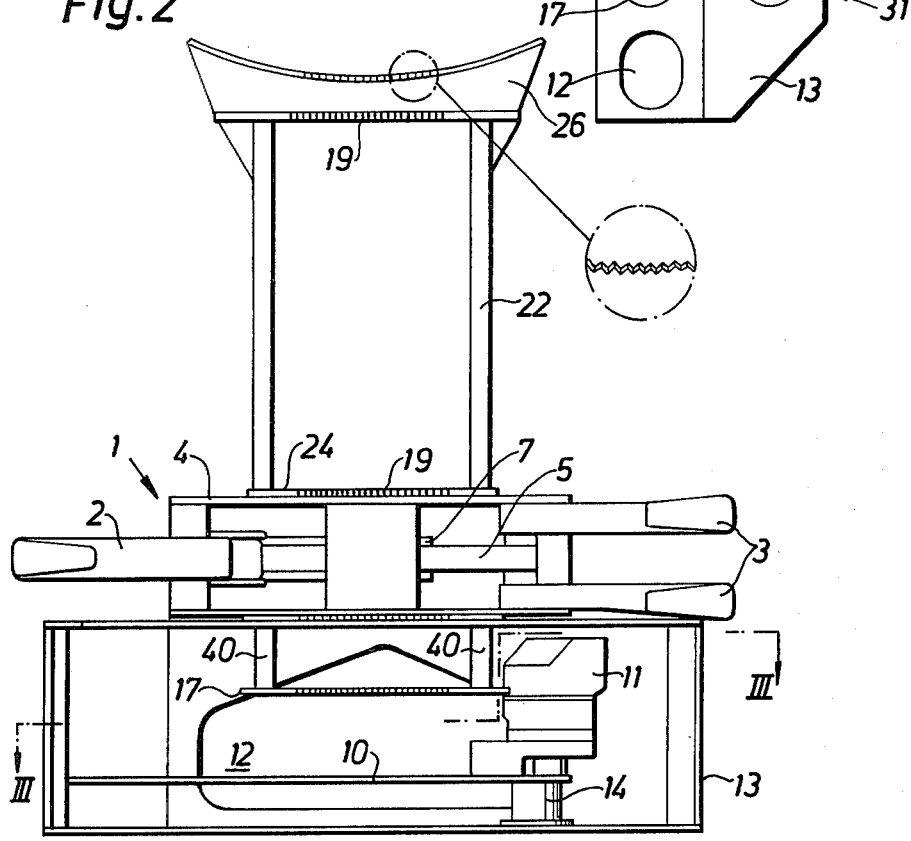

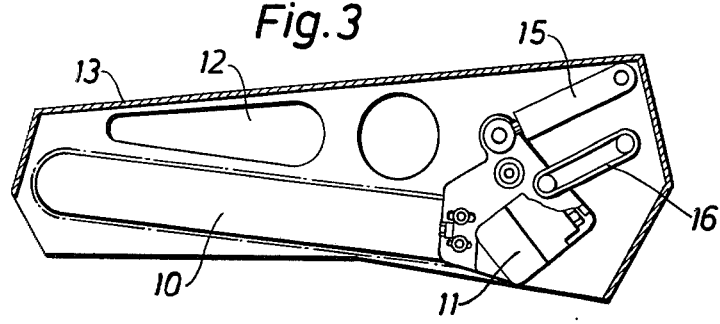
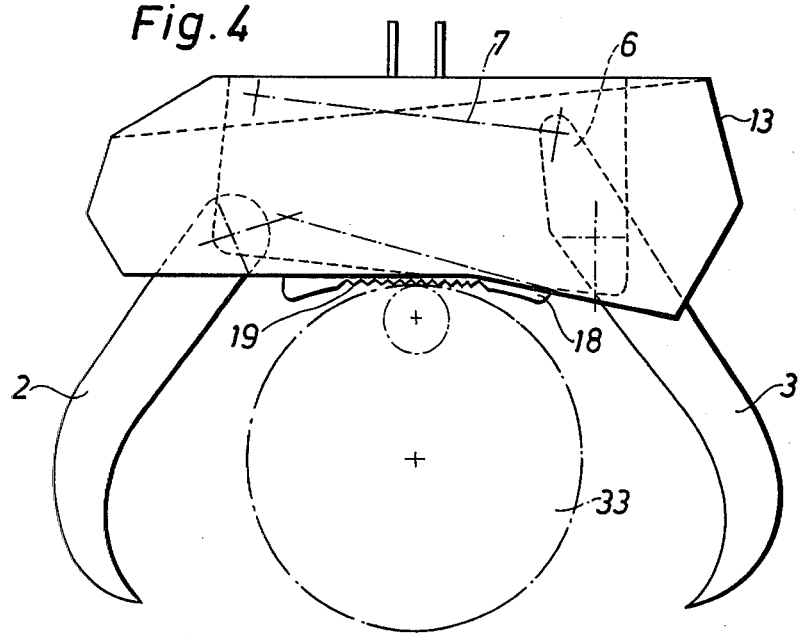
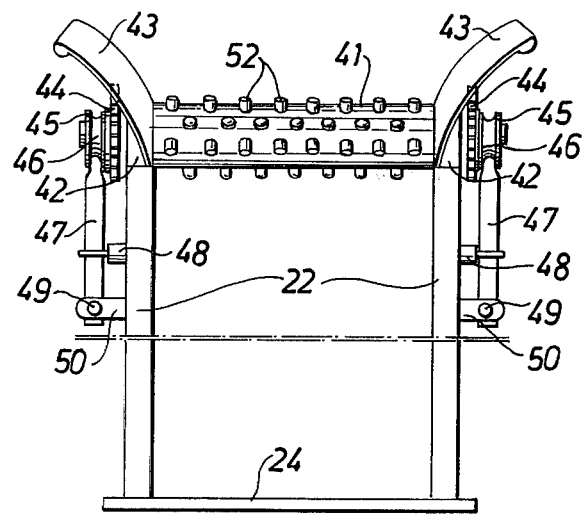
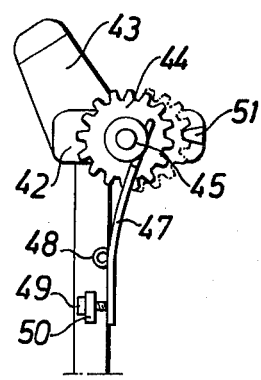

TREE-FELLING APPARATUS

BACKGROUND OF THE INVENTION

The present invention relates generally to harvesting trees, and more particularly to a novel tree-felling apparatus to be suspended in the arm of a crane of a vehicle.

In the timber industry trees are processed in stages into trunks or assorted timber. When these stages are mechanised—in the first place felling, lopping, marking for cross-cutting and cross-cutting—equivalent capacity is required in the various devices in order to achieve maximum production.

In this respect the felling operation has been the most difficult to solve—both as a replacement for manual felling when the work is performed in separate operations and in combination with other mechanised processing.

Due to their weight or complicated construction, felling units known hitherto have been unable to fulfil the demands for capacity and, furthermore, they require a special crane to operate them. The known felling units are also compulsorily manoeuvrable, which contributes to increased weight and complicates the construction further in view of the necessity for special operating members and stand parts. Furthermore, said known units are provided with special gripper means designed to grip the stump part to serve as counter-support during felling. This also contributes to increased weight and complicated construction, besides the cut having to be made at an unacceptably high level. See, for instance, U.S. Pat. No. 3,991,799.

SUMMERY OF THE INVENTION

The object of the present invention is to solve the problems described above in a satisfactory manner and considerably reduce the drawbacks of earlier constructions.

This is achieved according to the invention in that the apparatus comprises a gripping means having gripper claws and a stand on which the gripper claws are pivotably journalled, a support means mounted to said stand to cooperate with the tree-trunk and a severing means mounted to said stand and said apparatus being freely pivotable about a shaft which is journalled in said stand, said severing means being arranged below the gripping means seen in the operative position of the apparatus against the tree-trunk, said support means including a guide means located above, seen in said operative position, and spaced from said gripping means, said guide means being arranged to be applied against the tree-trunk to guide and position the gripping means and the severing means to operative positions with respect to the tree-trunk, and said apparatus being designed to assume an inclined position with respect to the ground when in unaffected condition, with the guide means located in front of the gripping means and at a higher level than the end of the severing means facing away from the gripping means.

The present invention offers an extremely simple and flexible felling apparatus which also fulfils the demands stated above for capacity. The felling apparatus is thus freely suspended from the end of a crane arm and, thanks to its low weight, existing cranes intended for handling the timber, for instance, can be used to operate the apparatus. Characteristic of the invention is also the balance at the point of suspension, which gives the felling apparatus an appropriate angle in relation to the tree to be felled. This simplifies the guiding and positioning against the tree for the subsequent fixing of the felling apparatus in severing position along the tree with the help of the gripping means. In its freely hanging position, furthermore, the felling apparatus is always in position to grip felled trees or trunks for handling or cross-cutting.

For initial directioning of the apparatus a rotator can be used which is connected in the link system between the tip of the crane and the felling unit apparatus. However, in simplified form, this can be achieved by a self-guiding suspension (with automatic return to a certain position due to gravity) and by manoeuvring the crane tip to the desired position. In both cases the operative positions can be selected at will since the working direction of the felling apparatus can be selected within a sector—from the point of oscillation of the crane—which is determined by the adjacence of the crane arm to one or other side of the tree, i.e. within a sector in excess of 180°.

BRIEF DESCRIPTION OF THE DRAWINGS

FIG. 1 is a side elevation view of a felling apparatus according to the invention seen in its operative position engaging a tree, FIG. 2 is a front elevation view of the felling apparatus according to FIG. 1, FIG. 3 is a section along the line III—III in FIG. 2, FIG. 4 is a view of the felling apparatus according to FIG. 1 seen from below, FIG. 5 is a front elevation view of a support means for a felling apparatus according to another embodiment of the invention, and FIG. 6 is a side elevation view of the support means according to FIG. 5.

DESCRIPTION OF THE PREFERRED EMBODIMENT

Referring to FIGS. 1 and 2 the apparatus of the invention comprises the three following main elements: a gripping means 1, a severing means 31 and a support means 32, the two latter being mounted on opposite sides of the gripping means. The gripping means 1 has a single gripper claw 2 and a fork-shaped gripper claw 3 with a space for receiving the single gripper claw 2 therebetween. The gripper claws 2, 3 are pivoted in a stand 4 and joined together by a link 5. The gripper claws 2, 3 are actuated by means of a hydraulic piston and cylinder arrangement 7 acting between the stand 4 and the gripper claw 3 provided with a torque arm 6, as shown schematically in FIG. 4. A rotator 9 is pivotably attached in the stand 4 about a horizontal shaft 8. The following apparatus is designed to be suspended from this rotator which is pivoted in a crane of a vehicle not shown in the drawings. The crane may be of the telescopic or foldable type.

The severing means 31 of the felling apparatus is rigidly mounted to lower parts of the stand 4. The severing means may be of the sawing or cutting type. In the embodiment shown, it consists of a motor-driven cross-cut saw 10 provided with cutting bar and chain which, together with its hydraulic motor 11, is pivotable in a casing 13 provided with a number of holes 12 allowing snow to pass through. The casing is secured to the lower side of the stand 4 of the gripping means. The cross-cut saw 10 is arranged substantially parallel with the shaft 8 and mounted on a pivot 14 fitted on the casing 13. A piston and cylinder unit 15 is arranged between the saw 10 and the casing 13 to swing the saw 10 forwardly out to cutting position. A return spring means 16, shown in the drawings as a rubber-band, although other types of spring members may be used, is arranged between the saw and the casing to swing in the saw, at least if the piston and cylinder arrangement 15 only is single-acting.

A support plate 17 is also arranged inside the protective casing 13 of the saw. This is secured by spacers 40 to the upper side of the protective casing, at a distance from this and from the bar of the saw. As shown especially in FIG. 4, the forward free edge portion 18 of this support plate lies slightly outside the protective casing 13 to provide a support against the tree when the apparatus is in operative position against the tree.

As mentioned above the severing means is arranged below the gripping means, as seen in operative position of the apparatus when the gripping means assumes horizontal position while gripping a tree. Seen in the same position of the gripping means, the support member 32 is rigidly arranged above the gripping means, more particularly it is fixed to the stand of the gripping means. The support member comprises a leading guide means located above and at a predetermined distance from the stand 4 in order to catch the tree to be severed and guide and position the felling apparatus against the tree to accurate operative position. The guide means is mainly formed of the part which is located furthest from the shaft 8. In the embodiment shown it is formed by an inclined plate 26 with a free edge portion 28 arranged on a horizontal plate 21 and supported by wedge-shaped brackets 27 which are firmly attached to the plates 21 and 26. The horizontal plate of the guide means has a forward free edge portion 20 arranged to form an upper trunk support in the operative position of the felling apparatus against the trunk 33.

The guide means is supported at a predetermined distance from the gripping means 1 by two support legs 22 with stays 23, said support legs and stays being secured to a common lower plate 24 rigidly mounted on the stand 4 of the gripping means. This lower plate is provided with a forward free edge portion 25 which, like the edge portions 18 and 20, is arranged to form a trunk-support when the felling apparatus assumes its operative position against the tree-trunk 33. These three edge portions are concave in shape and are provided with teeth 19. Furthermore, as will be understood, the three edge portions 18, 20, 25, are arranged in line with each other, this line (designated 30 in FIG. 1) forms substantially a right angle with the plane of movement of the gripping claws 2, 3.

The free edge portion 28 of the guide means is also concave in shape and provided with similar teeth 19. As can be seen in FIG. 2, this head part extends further in lateral direction than the lower edge portion 20 of the horizontal plate. In the embodiment shown the edge portion 28 of the guide means is arranged somewhat inside said line 30 but may be positioned in another way if desired in order to achieve the catching, guiding and positioning functions aimed at. For instance, the edge portion 28 may be in line with the edge portions forming the spaced trunk supports and with such an embodiment it will also have the function of a trunk support so that the plate 21 or its edge portion 20 may be omitted. Furthermore, the guide means may be provided with a special pin-like handles or similar side arms extending forwardly at the two free or outer corners of the plate 26 from its edge portion 28. Such forwardly extending arms further facilitate catching or grasping the tree and guiding the felling apparatus when this is to be moved to operative, vertical position against the tree-trunk 33 from a freely suspended, inclined position with respect to the ground.

Like the support means 32 arranged on the upper side of the gripping means, the severing means and more particularly its protective casing 13 may be detachable in relation to the stand 4 of the gripping means. This enables simple and quick replacement of damaged or worn parts as well as enabling the gripping means of the felling apparatus to be used only as a gripping means if desired.

Furthermore, in accordance with the principles on which this invention is based, the centre of gravity of the felling apparatus freely movable about the shaft 8 is located so that, when not in use, i.e. in unaffected condition, the felling apparatus assumes an inclined position in relation to the ground with the guide means 26, 28 positioned in front of the gripping means and at a higher level than the opposite end of the felling apparatus facing away from the gripping means or, in other words, at a higher level than a horizontal plane through the shaft 8. According to a practical embodiment which is preferred, the severing means 31 is heavier than the upper support means 32 so that the felling apparatus will have a centre of gravity which is displaced from a plane through the shaft 8 (FIG. 1) parallel to the gripping claws, in the direction of the severing means 31 so that, when in unaffected condition the felling apparatus will assume the inclined position described above. The centre of gravity of the felling apparatus can be adjusted to achieve the desired inclined position by the choice of suspension point for the shaft 8 in the stand 4. The gripping means stand may thus be extended upwards, for instance, and the shaft 8 journalled in said extension.

Since the felling apparatus can swing freely about the shaft 8, it will always endeavour to assume its inclined position in relation to the ground and can even be caused to swing more or less about said shaft 8 if necessary to facilitate placing the apparatus against and applying it around the tree to be felled.

The felling apparatus which, due to the rotator 9, is pivotable about a rotary axis 35 indicated schematically in FIG. 1 and can thus be set in any desired position in relation to said rotary axis, is guided quite simply in that, with the support means 32 facing forwards, the apparatus is moved by means of the crane arm in the direction of the tree to be felled. The guide means 26, 28 will thus first catch or come into engagement with the tree and the felling apparatus with the guide means as support and point of pivot, can then be swung down and in against the tree by simply lowering the crane arm until at least the opened gripper claws 2, 3 of the gripping means are able to grip and thus pull in the felling apparatus towards the tree to operative position in which, therefore, the felling apparatus is in contact with the tree by means of its trunk supports 18, 20 and 25. Due to the guide means, therefore, the felling apparatus will be easily and quickly brought into alignment with the tree, and due to the gripping means it will always be held against the tree in the correct position with respect to the saw 10 of the severing means. Should it be necessary to lower the apparatus to avoid having too high a tree-stump, the gripper claws can simply be opened slightly, permitting the apparatus to slide down the tree due to its own weight. In practice this lowering is usual since the point of engagement and pivot for the guide means is usually chosen at a higher level. Sometimes it may even be necessary to raise the felling apparatus, for instance, to avoid sawing into stones on the ground.

When felling the tree pinching can be prevented by simply lifting the felling apparatus with the held of the crane arm. When the tree has been felled with the help of the cross-cut saw the gripping means of the apparatus is used as a normal grip to lift the felled tree and possibly pass it into a tree harvering machine or processor or for cutting into logs or to place the unlopped tree on a load carrier, such as a special tractor provided with the crane in which the present felling apparatus is suspended.

It is clear from the above description that the felling apparatus is free from means, such as hydraulic means arranged to compulsorily manoeuvre the felling apparatus in order to achieve correct alignment with respect to the tree-trunk. It is also free from additional gripping means to grip the stump part of the tree, said gripping means being located below the sawing or cutting member of the severing means.

FIGS. 5 and 6 show a modified embodiment of the guide means according to the present invention, which has been especially developed to facilitate movement and adjustment of the felling apparatus along the the tree to the felling position of the sawing or cutting member and in order to avoid damage to the timber. According to this embodiment the guide means comprises a rotatable roller 41 provided with a special locking means. The roller 41 is journalled in spaced plates 42 connected to the support legs 22, said plates having elongate apertures permitting a movement of the roller substantially perpendicular to the support legs 22. Handles 43 are provided on the plates 42 to further ensure that the felling unit is correctly guided to the tree. On the shaft ends of the roller 41, outside the plates are cam plates 44 with toothed profile, fixed to the shaft and also pulleys 45 provided with a groove 46. The pulleys 45 are actuated by springs 47 which always endeavour to keep the roller 41 in forward position. The grooves 46 constitute seats for the abutting parts of the springs 47 and permit displacement of the spring relative to the pulleys 45. The springs 47 are journalled in sleeves 48 on the support legs 22 and can be regulated by means of screws 49 screwed into support plates 50 on the support legs 22.

On the rear edge of the plates 42 and in the centre line of the elongate aperture where the roller 41 is journalled with its shaft ends, there is a stop 51 which engages the cam plate 44 in its rear displaced position. A number of spikes are arranged radially around the roller 41.

The device described above functions as follows: In its forward position the roller 41 can rotate freely and the felling apparatus can be moved along the trunk, up or down, without resistance when applied against the tree. When the gripper claws 2, 3 force the felling apparatus into operative severing position against the tree, the roller 41 is moved back by the application force and locked when the cam plates 44 engage the stops 51. The forward surface of the roller 41 is now in line with the spaced support edges 18 and 25 and contributes to fixing the felling apparatus against the tree. If the grip of the claws 2, 3 is released so that the clamping force ceases, the springs 47 will move the roller 41 forwards and release the cam plates 44 from the stops 51. The felling position can then be adjusted without the trunk being damaged.

I claim:

1. Apparatus for felling trees, adapted to be suspended by the arm of a crane by means of a bearing shaft, said apparatus comprising a stand journalled on said bearing shaft to pivot freely about a horizontal axis, means for gripping said tree comprising a pair of cooperative claws pivotally journalled on said stand, means for severing said tree arranged on said stand below said gripping means, means for supporting said trees arranged on said stand above said gripping means, said supporter means extending upwardly from said stand and having means for guiding said gripping means and severing means into an operative position with respect to said tree, the center of gravity of said apparatus being offset from the horizontal axis so that said apparatus is normally inclined with respect to ground whereby the guide means is located in front of the gripping means when said apparatus is in an inoperative position with respect to the tree.

2. An apparatus as described in claim 1, wherein a portion of said guide means is arranged in line with a support for said severing means, said line extending substantially perpendicular to the plane of movement of said gripper claws.

3. An apparatus as described in claim 1, wherein said guide means is arranged substantially parallel to said bearing shaft.

4. An apparatus as described in claim 3, wherein said guide means is rotatably journalled.

5. An apparatus as described in claim 4, wherein said guide means comprising a rod.

6. An apparatus as described in claim 4, wherein said guide means is journalled to be moved by the action of spring force between a front starting position and a rear position.

7. An apparatus as described in claim 6, wherein said guide means includes a locking means to lock it in its rear position.

8. An apparatus as described in claim 7, wherein guide means is journalled by shaft pins at end and said locking means comprises a cam plate on each shaft pin and a rear stop to engage with the cam plate in the rear position to which said guide means is moved.

9. An apparatus as described in claim 4, wherein said guide means includes two side arms extending forwards and secured to parts of said support member.

* * * * *